United States Patent [19]

Graham

[11] Patent Number: 4,750,416

[45] Date of Patent: Jun. 14, 1988

[54] AIR HEAD MODULE

[75] Inventor: John Graham, Aspley, Australia

[73] Assignee: Heat and Control Pty. Ltd., Mt. Gravett, Australia

[21] Appl. No.: 824,732

[22] Filed: Jan. 31, 1986

[30] Foreign Application Priority Data

Feb. 5, 1985 [AU] Australia .............................. PG9146

[51] Int. Cl.⁴ .............................................. A23B 4/06
[52] U.S. Cl. ....................................... 99/476; 99/478; 99/483
[58] Field of Search .................. 99/467, 470, 473–476, 99/477–479, 483, 516, 517; 34/147; 62/63, 381; 198/339, 610, 778, 844

[56] References Cited

U.S. PATENT DOCUMENTS

| 3,792,595 | 12/1974 | Willis | 62/414 |
| 4,271,683 | 7/1979 | Williams | 62/374 |
| 4,363,263 | 7/1979 | Williams | 99/352 |
| 4,370,861 | 12/1981 | Lovette, Jr. | 62/63 |
| 4,480,535 | 6/1983 | Jaxmar | 99/476 |

Primary Examiner—Timothy F. Simone
Attorney, Agent, or Firm—Flehr, Hohbach, Test, Albritton & Herbert

[57] ABSTRACT

A gas head module for use in an apparatus to air treat food products, said module having a gas inlet and a gas outlet which are connect by a side wall defining a passage which follows a spiral path, with said passage diminishing in cross sectional area from said inlet to said outlet.

8 Claims, 4 Drawing Sheets

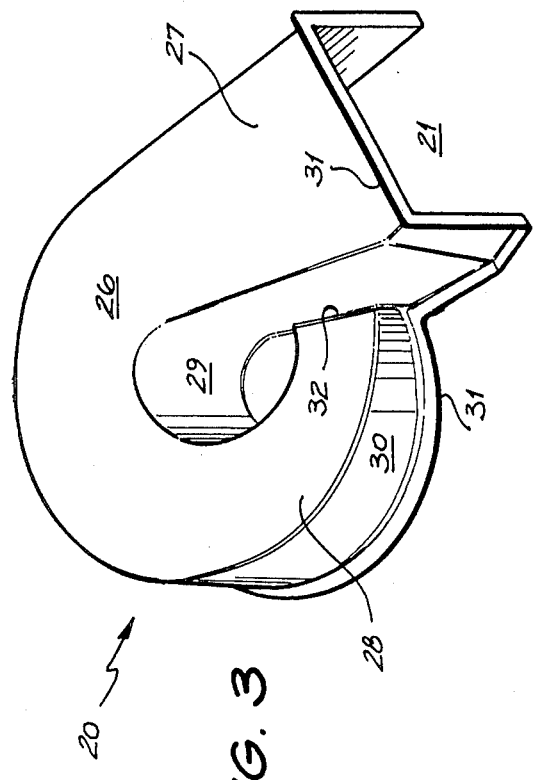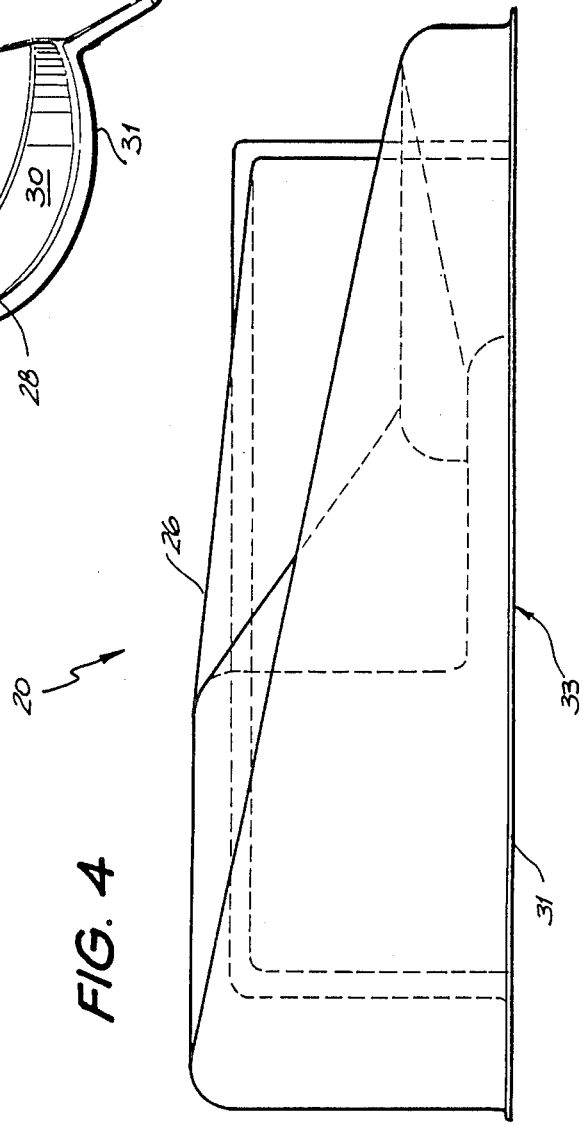

AIR HEAD MODULE

TECHNICAL FIELD

The present invention relates to air delivery ducts and more particularly but not exclusively to air head modules to be used in conjunction with spiral conveyors.

BACKGROUND ART

In the food processing industry, spiral conveyors having a generally vertical axis, are often employed in view of the economies in respect of floor space. These spiral conveyors are of particular advantage where the product requires lengthy exposure to a controlled environment, such as drying, heating, cooking, cooling and freezing. Accordingly the spiral conveyors are generally housed within an insulated enclosure so that the environment may be controlled. Within this controlled environment, often air is treated and then passed across the product in order to subject the product to the desired conditions. However it is a disadvantage of these known apparatus, that the air stream delivered to the conveyor, is not uniform in flow rate along the height of the conveyor nor angularly about the conveyor. Known apparatus have attempted to overcome this problem by internal or external baffles, or tuning vanes. However these known apparatus have not been totally successful and are generally expensive due to the requirement for baffles and vanes.

The above discussed spiral conveyors are disclosed in U.S. Pat. No. 4271683, U.S. Pat. No. 4363263, U.S. Pat. No. 4480535 (AU 15751/83), AU 21748/83 and AU 11905/83.

Of this prior art, the most relevant is U.S. Pat. No. 4480535, which relates to an "Apparatus for Air Treatment of Products". This document discloses an apparatus to freeze foodstuffs, which apparatus has as its inventive feature a perforated cylinder which continuously varies the air supply over the length of the spiral conveyor. No consideration is given to causing the air supply to rotate about the axis of the conveyor.

OBJECT OF THE INVENTION

It is the object of the present invention to overcome or substantially ameliorate the above disadvantages.

BRIEF DISCLOSURE OF THE INVENTION

There is disclosed herein a gas head module, said module having an inlet, and an outlet with a side wall extending therebetween which defines a passage along which gas being ducted by the module passes, and wherein said passage follows a spiral path and has a cross-sectional area which diminishes from said inlet.

BRIEF DESCRIPTION OF THE DRAWINGS

A preferred form of the present invention will now be described by way of example with reference to the accompanying drawings wherein:

FIG. 3 is a schematic top perspective view of an air head module employed in the apparatus of FIGS. 1 and 2;

FIG. 4 is a schematic side elevation of the air head module of FIG. 3;

DETAILED DESRIPTION OF THE PREFERRED EMBODIMENT

Figure 1:
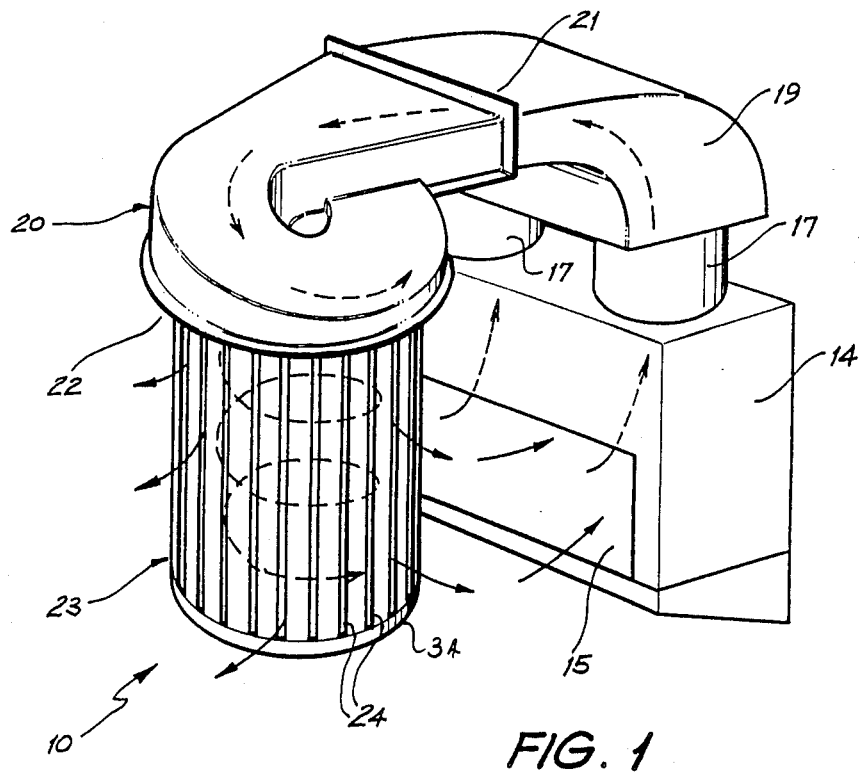
FIG. 1 is a schematic perspective view of a heating or cooling assembly to be used in conjunction with a spiral conveyor.
Figure 2:
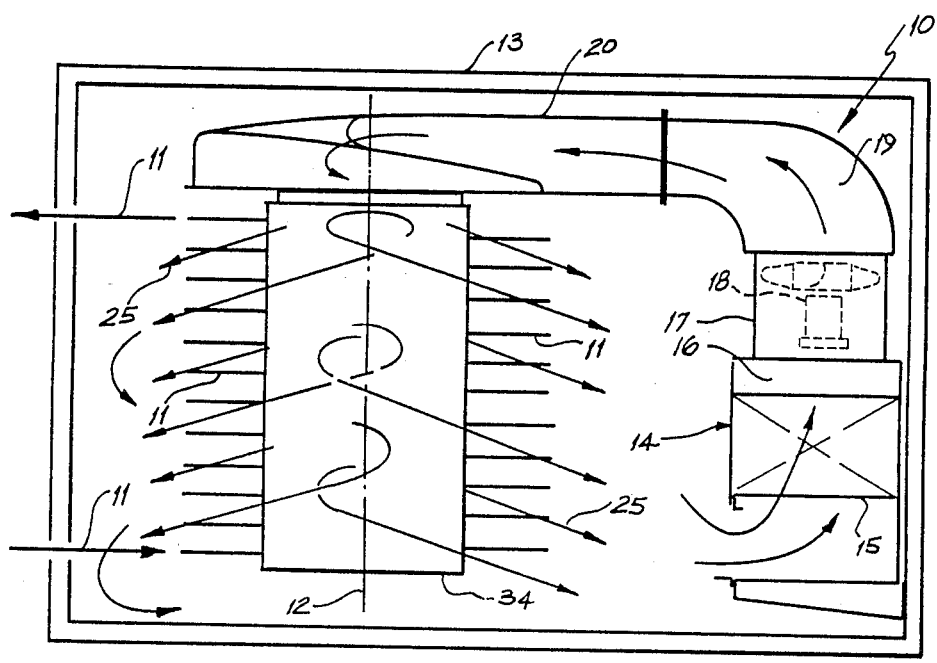
FIG. 2 is a schematic side elevation of the apparatus of FIG. 1.
Figure 5:
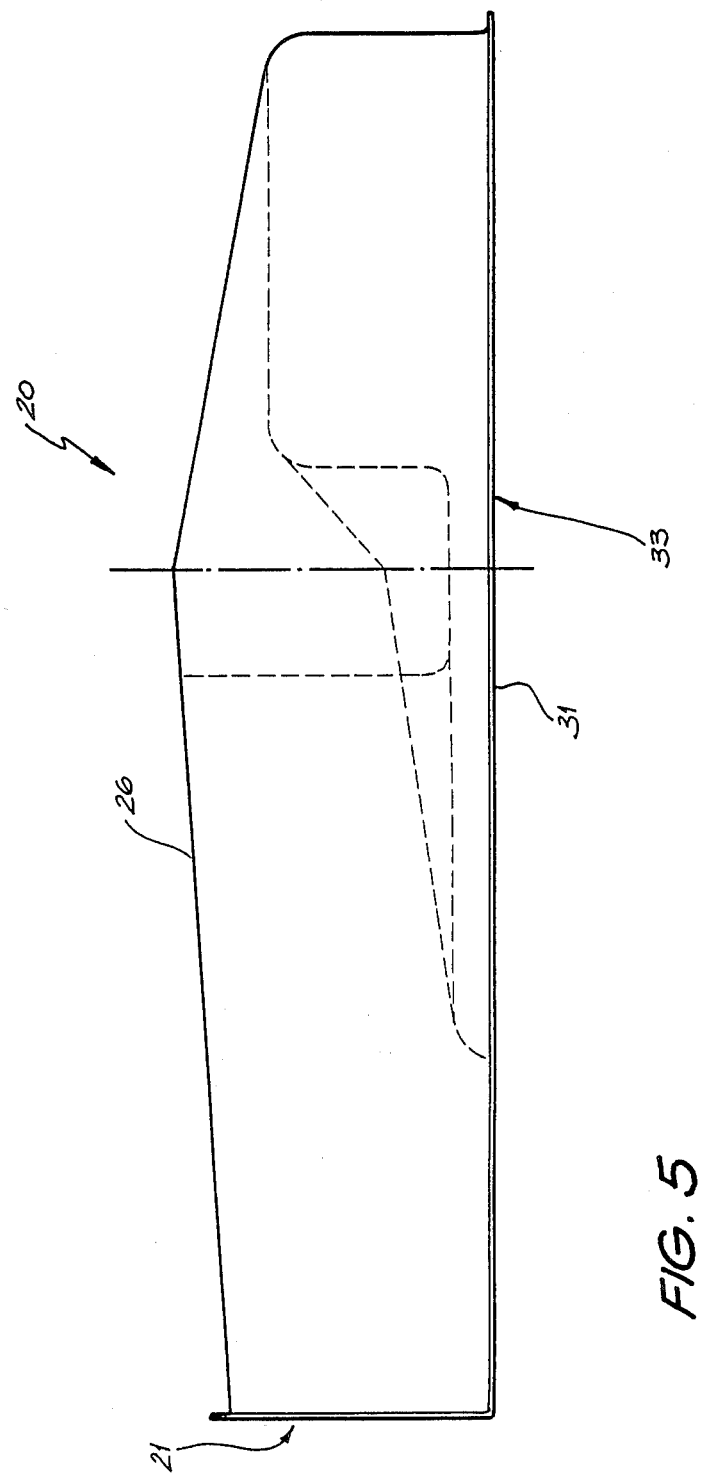
FIG. 5 is a schematic front elevation of the air module of FIG. 3.
Figure 6:
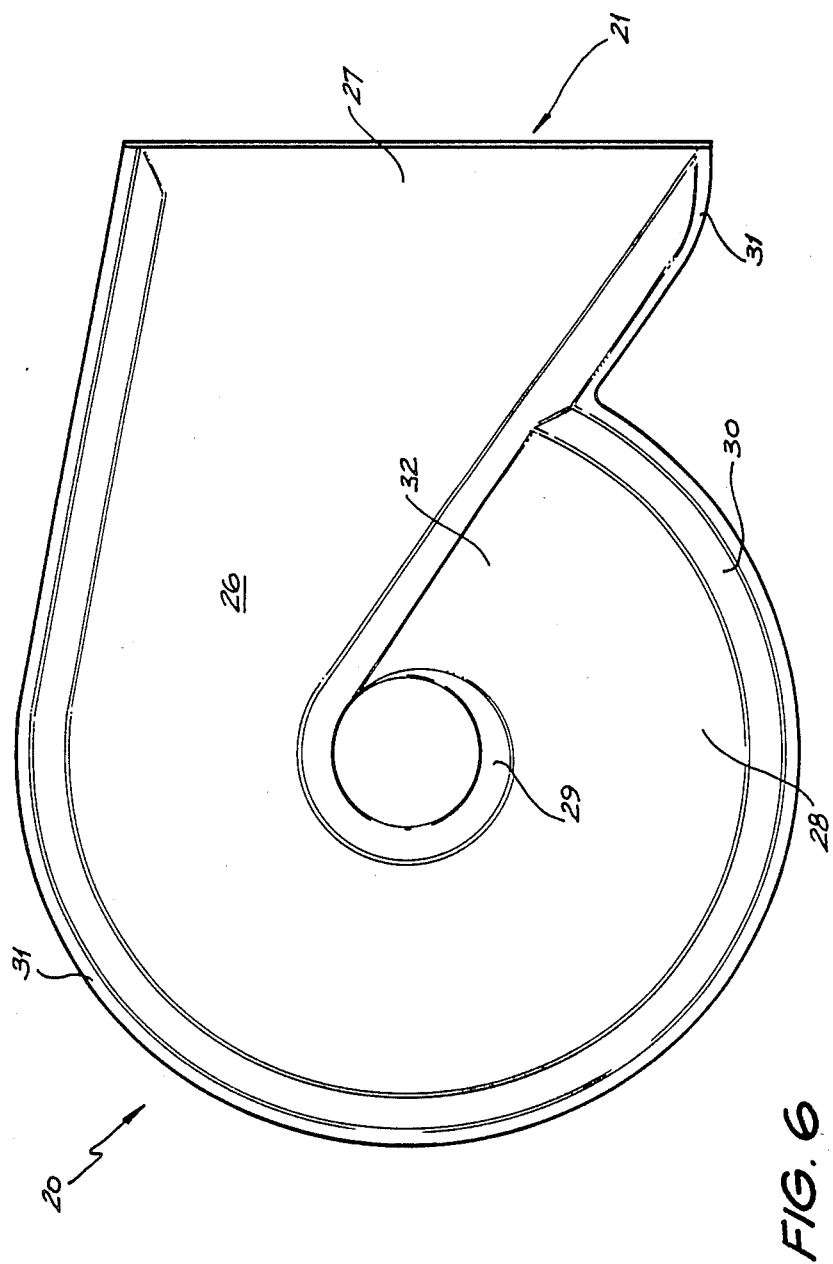
FIG. 6 is a schematic plan view of the air head module of FIG. 3.

In FIG. 1 there is schematically depicted an apparatus 10 to be used in conjunction with a spiral conveyor having an endless belt 11 following a spiral path surrounding a generally vertical axis 12. The conveyor 11, as best seen in FIG. 2, conveys a food product along a spiral path, with the apparatus 10 adapted to control the environment to which the product is subjected. For example, the apparatus 10 could cool or heat the food product on the conveyor, or alternatively could carry out other processes such as drying, cooking or freezing by passing a gas such as air, over the food product. The spiral conveyor is located within an insulated enclosure 13 so that the environment to which the food product is subjected, may be controlled. In this particular embodiment, the apparatus 10 is also located within the enclosure 13.

In this particular example, the apparatus 10 includes a heating or cooling unit 14 having an inlet 15. The unit 14 has an outlet 16 which communicates with two circular ducts 17 which each house a fan assembly 18. The ducts 17 communicate with a further duct 19 which delivers air to an air head module 20 best seen in FIGS. 3 to 6. The module 20 has an inlet 21 and an outlet 22, with the outlet 22 delivering air to the interior of a drum 23. The drum 23 is provided with a plurality of slots 24 which in this particular example are generally straight and extend generally vertically of the drum 23. The drum 23 is closed at its lower end by an end wall 34. Additionally the slots 24 are angularly spaced about the longitudinal axis 12 of the drum 23, which axis 12 is also the vertical axis of the spiral conveyor. However it should be appreciated that other slot configurations may be also employed depending on the air flow pattern required. Air exiting from the slots 24 then passes between the convolutions of the belt 11 so as to pass across the product contained on the belt 11. Once the air has passed across the product it is then circulated back through the unit 14 due to the fans 18. Additionally, the drum 23 is rotatably mounted and driven so as to rotate about the axis 12.

The above decribed preferred embodiment of the present invention has the advantage that the module 20 delivers a circulating air stream to the interior of the drum 23. This circulating air stream follows a path around the axis 12 as well as moving vertically downward from the module 20. This circulating air stream within the drum 23 cooperates with the slots 24 so as to deliver an air stream 25 which moves angularly about the axis 12 as well as being inclined at approximately 30° to the horizontal.

Turning now to FIGS. 3 to 6, wherein the module 20 is more fully depicted. The module 20, as described earlier, has an inlet 21 to which the air is delivered by the fans 18. The passage of the module 21 has a top wall 26 and side walls 29 and 30, providing a passage upstream portion 27 and a passage downstream portion 28. This upstream portion 27 diminshed in cross-sectional area and directs the air to the downstream portion 28, which downstream portion 28 follows a generally spiral path. The width of the downstream portion 28 is generally constant. The internal side wall 29 and the external side wall 30 are generally vertical and the wall 26 is basically vertically facing. Both the walls 29 and 30 follow a spiral path and diminish in height from the inlet 21 to the outlet 22. The walls 26, 29 and 30, direct the air flowing therethrough to follow a spiral path, by causing the air to circulate about the axis 12, as well as causing the air to move vertically down the drum 23. Additionally a peripheral flange 31 is provided to aid in sealingly connecting the module 20 to the duct 19 and the drum 23.

It should be particularly noted, that the walls 26, 29 and 30 cooperate to define a passage which follows a spiral path, and which passage has a tranverse cross-sectional area which diminishes from the inlet 21 to the end 32. The cross-sectional area decreases by decreasing the depth of the spiral passage. However it should be appreciated that the width may also decrease if so desired. The passage is generally rectangular in cross section.

The module 20 has a bottom face 33 to deliver air to the interior of the drum 23, which bottom face 33 includes the outlet 22.

The outlet 22 is formed by an open face of the passage defined by the walls 26, 29 and 30, so that the outlet 22 extends longitudinally of the passage.

In the present preferred form, the module 20 is formed of fibreglass, however it should be appreciated that the module 20 could be formed of alternative materials such as sheet metal or plastics.

The abovedescribed preferred embodiment of the present invention has the advantage of delivering an air stream to the spiral conveyor, which air stream has a uniform velocity along the length of the conveyor, without the use of control vanes and baffles.

What I claim is:

1. An apparatus to treat food products by passing a gas thereover, said apparatus including an enclosure defining a generally closed chamber, a spiral conveyor located within said chamber, which spiral conveyor circulates about a generally vertical axis, a drum extending along said axis and having a longitudinal generally cylindrical peripheral surface about which said conveyor passes, flow passage means formed in said peripheral surface allowing gas to flow from the interior of said drum to food products supported on said conveyor; ducting means to deliver said gas to the interior of said drum at one end thereof, said ducting means including a gas head module having an inlet and an outlet with side wall means extending therebetween to define a flow passage along which gas being ducted by said module passes, and wherein said flow passage follows a spiral path and has a cross-sectional area which diminishes progressively from said inlet, said gas head module being mounted adjacent said one end of said drum to swirl the gas as it enters said one end of said drum, and treatment means to treat said gas and deliver treated gas to said ducting means for delivery to said drum via said module.

2. The apparatus of claim 1 wherein said flow passage has an open face extending longitudinally thereof, which open face provides said outlet.

3. The apparatus of claim 2 further including two further walls which co-operate with said side wall to define said flow passage as having a substantially rectangular transverse cross section.

4. The apparatus of claim 3 wherein said passage has a substantially constant width, which width extends radially from the axis about which the passage spirals, and the depth of said passage diminishes from said inlet.

5. The apparatus of claim 3 wherein said inlet communicates with an upstream portion which extends to said flow passage, which upstream portion diminishes in cross-sectional area from said inlet to said passage.

6. An apparatus to treat food products by passing a gas thereover, said apparatus including an enclosure defining a generally closed chamber, a spiral conveyor located within said chamber, which spiral conveyor circulates about a generally vertical axis, a drum extending along said axis and having a longitudinal generally cylindrical peripheral surface about which said conveyor passes, flow passage means formed in said peripheral surface allowing gas to flow from the interior of said drum to food products supported on said conveyor; ducting means to deliver said gas to the interior of said drum at one end thereof, said ducting means including a gas head module having an inlet and an outlet with side wall means extending therebetween to define a flow passage along which gas being ducted by said module passes, said flow passage having an open face extending longitudinally thereof to provide said outlet, two further walls disposed to co-operate with said side wall to define said flow passage as having a substantially rectangular transverse cross-section, and wherein the last named flow passage follows a spiral path and has a cross-sectional area which diminishes progressively from said inlet, said inlet communicating with an upstream portion which extends to said last named flow passage, which upstream portion diminishes in cross-sectional area from said inlet to said last named flow passage, said module being mounted adjacent said one end of said drum to swirl the gas as it enters said one end of said drum, and treatment means to treat said gas and deliver treated gas to said ducting means for delivery to said drum via said module.

7. An apparatus to treat food products by passing a gas thereover, said apparatus including an enclosure defining a generally closed chamber, a spiral conveyor located within said chamber, which spiral conveyor circulates about a generally vertical axis; a drum extending along said axis and having a longitudinally generally cylindrical peripheral surface about which said conveyor passes; passage means formed in said peripheral surface allowing gas to flow from the interior of said drum to food products supported on said conveyor; ducting means to deliver said gas to the interior of said drum at one end thereof, said ducting means including a gas head module mounted adjacent said one end of said drum, said module having an inlet and an outlet with a side wall extending therebetween which defines a passage along which gas being ducted by said module passes, with said passage following a spiral path and having an open face which extends longitudinally of said passage, with said face providing said outlet; and treatment means to treat said gas and deliver treated gas to said ducting means for delivery to said drum via said module.

8. The module of claim 7 wherein said passage has a cross-sectional area which diminishes from said inlet.

* * * * *